United States Patent Office 3,150,956
Patented Sept. 29, 1964

3,150,956
MIXED FERTILIZERS CONTAINING UREAFORM
Joseph A. Smith, Richmond, and Richard E. Formaini, Colonial Heights, Va., assignors to Allied Chemical Corporation, New York, N.Y., a corporation of New York
No Drawing. Filed Feb. 8, 1962, Ser. No. 171,813
4 Claims. (Cl. 71—29)

This invention relates to a process for the preparation of mixed fertilizers containing a large portion of its nitrogen in the form of slow acting ureaform nitrogen of good agronomic availability.

Ureaform nitrogen has been used in admixture with other fertilizer materials. In most processes of the prior art, the urea and formaldehyde are admixed in the desired proportions, reacted and dried, to give the solid ureaform which is then mixed with the other fertilizer ingredients. It has furthermore been suggested that the ureaform be formed in situ by allowing the reaction between urea and formaldehyde solutions to take place in the presence of acidic fertilizer materials, wherein the acidic nature of the fertilizer is used to bring the pH of the reactants within the proper reaction range of urea to formaldehyde.

While ureaform prepared in accordance with certain of the processes of the prior art makes suitable nitrogenous fertilizers of slow availability and high nitrogen content, the processes require either the use of a complex plant or a prolonged curing period at selected temperatures. As a result, the price of the product is necessarily high.

It is now been found that it is possible to make a mixed fertilizer containing a large portion of its nitrogen in the form of a coating of a slow acting ureaform of good agronomic availability without resort to prolonged curing by forming a solution of urea and ammonium salts at a temperature of 70 to 95° C. with a pH lying within the range of 4 to 6.5; said ammonium salts being selected from the group consisting of monoammonium phosphate, diammonium phosphate, mixtures thereof, and mixtures with ammonium sulfate; adding sufficient urea-formaldehyde concentrate to adjust the urea to formaldehyde mol ratio to 1.2–2.0; the constituents of the resulting mixtures being present in the ratio equivalent to 1 part urea to 0.1–1 part phosphoric acid, 0–0.5 part sulfuric acid, and 0.2–1 part water; within 1 to 20 seconds of such addition mixing 0.1 to 1 part of the resulting mixture with 2 parts of fertilizer solids; said solids being introduced to the mixing vessel at a temperature between 35 and 60° C.; adjusting the pH of the moist mixture to 5–7; and drying the moist fertilizer mixture to final solids temperature between about 90 and 100° C. to obtain a ureaform coated fertilizer in which the water-insoluble nitrogen has an activity index above about 40.

The mixture of urea, water, and ammonium salts may be made by dissolving 1 part urea in 0.1–1 part $H_3PO_4$, 0–0.5 part $H_2SO_4$, 0.2–1 part of $H_2O$ and sufficient $NH_3$ to adjust the pH to 4–6.5. To accomplish this, the phosphoric acid, sulfuric acid, or a mixture of the two acids may be fed to an agitated tank to neutralize the ammonia and provide heat. The ammonia may be provided as anhydrous ammonia, aqua ammonia, a solution of urea and ammonia in water, a solution of urea, ammonium nitrate and ammonia in water, or a solution of ammonium nitrate, ammonia and water. Urea in solid form, such as crystal or pelleted urea, may also be fed to the tank to provide the additional urea required by the formulation. A selection from these raw materials is made such that the heat generated by neutralizing the acids is at least sufficient to dissolve all the solid urea and bring the temperature of the mixture to at least 70° C. If more heat than this minimum amount is provided by the selected materials, water is fed to the tank to maintain the temperature in the range of about 70° C. to 95° C., and preferably between 78° C. and 90° C. At temperatures above this range urea hydrolysis and foaming present operating problems in the mixing tank and it is difficult to satisfactorily mix the effluent from the tank with urea-formaldehyde concentrate because of the rapid set-up time for the mixture at such temperatures. At temperatures below the operating range, conversion of urea to water-insoluble nitrogen products is substantially reduced when operating at pH ranges favoring the formation of ureaform of good agronomic value.

The mixture in the tank is maintained at a pH between about 4 and 6.5, and preferably between 4.5 and 5.5. At pH above 6.5, the reaction to form ureaform is so slow in the subsequent mixing operations that to a large extent the reaction takes place only when the temperature of the fertilizer has been raised in the drying step and this results in operating difficulties as well as difficulty in the production of fertilizer of consistently good quality. At pH's below 4, the water-insoluble nitrogen in the finished product generally has an activity index value below 40, as measured by the procedure given in paragraph 2.058 of the Official Methods of Analysis of the Association of Official Agricultural Chemists, 9th edition, 1960.

Retention times in the mixing tank may be from 2 to 30 minutes, with times in the range of 5 to 15 minutes preferred. Minimum times are fixed by the time necessary to uniformly blend and react the materials fed and to obtain essentially complete solution of the solid urea. Long retention times in the tank lead to sufficient hydrolysis of urea to affect the pH and thus complicate the calculation and control of the flow rates of acid and base solutions to provide the desired pH in the mix tank and to produce fertilizer of the desired grade.

A solution of polymethylol ureas, such as the urea-formaldehyde concentrate commercially available as N-dure (equivalent in composition to 60% formaldehyde, 25% urea, 15% water), is injected into the overflow line at a point that will provide about 1 to 20 seconds, preferably 2 to 10 seconds, mixing time before the combined stream of urea-formaldehyde concentrate and reaction mixture is discharged from the line. If more than 20 seconds mixing time is allowed at the temperatures used, the reaction will have proceeded too far to permit coating of solids with the ureaform product. The quantity of urea-formaldehyde concentrate used is selected to give a mol ratio of urea to formaldehyde in the combined stream of between 1.2 to 2.0, and preferably 1.4 to 1.8. Use of mol ratios below 1.2 results in products with water-insoluble nitrogen having a poor activity index. When mol ratios above 2.0 are used, the products generally have a very substantial portion of the urea charged remaining as free urea. This results in a fertilizer which is difficult to process in conventional equipment, such as crushers and screeners, and has relatively poor storage characteristics.

The pH of the mixture of urea-formaldehye concentrate with the ammonium salts solution from the reaction tank, as it discharges to the mixer in which it is combined with the other raw materials required by the formulation, must be held within the range of 4 and 6.5 to obtain ureaform nitrogen of good activity value, consistent conversion, and ease of operation. Preferably, the pH is held between 4.5 and 5.5. Generally, the higher values of pH are used with the lower mol ratios of urea to formaldehyde and the higher temperatures within the ranges given above, since these variables are interdependent in determining the extent and type of ureaform compounds formed. The ammonium salts when present in the mixture so as to give a ratio equivalent to 1 part urea to 0.1–1 part phosphate and 0–0.5 part sulfate seem to have a sufficient buffering effect that the urea-formaldehyde ammonium salts solution generally will have a pH practically the same as the pH of the ammonium salts solution alone. This makes it relatively easy to control and hold the pH in the desired range. The pH desired for the mixture can accordingly be obtained by simply selecting an ammonium salts solution of the desired pH and mixing it with the urea solution in concentrations to provide a ratio equivalent to 1 part urea to 0.1–1 part phosphate, 0–0.5 part sulfate and 0.2 to 1 part water. It is also feasible to operate the reaction tank near the upper limit of the pH range at pH 6.5, by adding the urea-formaldehyde concentrate in the overflow line, and then adding acid, such as phosphoric or mixtures of phosphoric acid and sulfuric acid, to the mixture immediately before it leaves the line to lower the mixture pH to the desired value in the range of 4.0 to 6.5.

The mixture of reaction tank solution and urea-formaldehyde concentrate may be discharged from the tank overflow line into a mixer, which can be a conventional fertilizer mixer, such as a TVA ammoniator or a pug mill. The other raw materials required in the fertilizer may also be charged to the mixer together with any recycle that may be desirable to control product granule size or moisture content. These materials may include products which provide additional plant food, such as ammonium sulfate, potassium chloride, potassium sulfate, dolomite, salts of the trace elements, superphosphates, ammonium phosphates, fillers and conditioners such as vermiculite or sand. When acidic materials are added, such as normal or triple superphosphate or monoammonium phosphate, it is desirable to increase their pH by addition of a basic material, such as ammonia, since it has been found that when the pH of the final product is below 5 a gradual lowering of the activity index of the water-insoluble nitrogen occurs during prolonged storage. The temperature of the solids added to the ammoniator is kept between 35 and 60° C., preferably at about 40–45° C., by use of cooled recycle if necessary, to promote formation of water-insoluble nitrogen with high activity index.

It is noteworthy that the pH of the mixture of all the materials in the formulation needs to be above 5 to preserve the high activity index of the water-insoluble nitrogen during prolonged storage. Surprisingly, the solid raw materials which are added directly to the solids-liquid mixer do not have an important influence on the reaction of urea and formaldehyde to form ureaform. The quantity and quality of the ureaform formed is chiefly determined by the composition, temperature and pH of the liquid mix formed by the dissolving tank effluent plus urea-formaldehyde concentrate which is spread on the solids. This factor permits wide latitude in selection of formulations and raw materials to obtain desired grades and physical characteristics of the finished product without complicating the production of desirable ureaform compounds in the fertilizer. It is thought that the solids added directly to the mixer may not dissolve to any appreciable extent in the liquid phase during the formation of the ureaform because of the short mixing times before drying, the high viscosity of the liquid phase, and the limited contact between the more soluble salts and the liquid phase, and for this reason these solids do not affect the ureaform reaction.

Mixing periods of at least three minutes and preferably at least four minutes are satisfactory. During this period a relatively uniform mixture of solids and liquids is obtained, the mixture forms into granules of desirable size, and the conversion of urea and formaldehyde to ureaform products is largely completed. Mixing periods should be below twenty minutes and preferably less than fifteen minutes. As mixing time is increased, there is a tendency toward over agglomeration which increases the need for recycle, and control of the production of a consistent quantity and quality of ureaform in the finished fertilizer becomes more difficult.

Near the discharge end of the mixer, ammonia, either in anhydrous form or as a solution, should be added to bring the pH of the mixture to between 5 and 7 and preferably to the range of 5.5 to 6.5, if it is not already in this range. Products made with this pH have shown no significant change in activity index of the water-insoluble nitrogen when stored for periods up to six months.

Excess water in the mixtures discharged from the mixer can be removed by conventional drying methods. Product temperatures during drying should be kept below 100° C. to avoid lowering the activity index of the insoluble nitrogen. Dried products should be cooled before final pile storage or bagging to eliminate further reaction. The fines and oversize are normally removed by screening and returned to the mixer to serve as recycle. The granular material of closely sized particles is removed as product.

*Example 1*

The following materials were fed to an open agitated tank equipped with an overflow line:

41.6 lbs./hr. pelleted urea (46% N).
15.7 lbs./hr. urea-ammonia solution (43.1% urea, 30.6% ammonia, 26.3% water).
28.2 lbs./hr. wet process phosphoric acid (54.3% $P_2O_5$).
1.9 lbs./hr. sulfuric acid (93% $H_2SO_4$).
12.0 lbs./hr. water.

At these flow rates average retention time in the tank was four minutes. The heat produced by the reaction of the ammoniacal solution and the acids resulted in the tank contents being brought to a temperature of 80° C. The pH of the solution in the tank was 5.4. It was found that substantially all the urea was dissolved when using these operating conditions. The solution overflowing from the tank was conducted through the overflow pipe to a TVA ammoniator. A solution of polymethylol ureas (equivalent in composition to 60% formaldehyde, 25% urea, and 15% water) was injected at a rate of 28.5 lbs./hr. into the overflow line at a point before it entered the TVA ammoniator, the point being chosen to give about five seconds for the solution from the tank and the polymethylol urea solution to mix before being discharged from the line. The pH of the mixed liquids leaving the overflow line was found to be 5.2. The following materials, at an average temperature of about 40° C., were fed into the inlet end of the ammoniator and mixed with the liquid from the line:

12.9 lbs./hr. potassium chloride (59.3% $K_2O$).
33.8 lbs./hr. expanded vermiculite.
9.5 lbs./hr. dolomite.
161 lbs./hr. recycled material obtained from subsequent operations.

An average of about six minutes was required for the materials to advance from the inlet to the discharge of the TVA ammoniator. At a point just before the material discharged from the ammoniator, anhydrous ammonia at a rate of 0.9 lb./hr. was injected under the bed of mixing material to bring the pH of the wet mixture to 6.0. Material leaving the TVA ammoniator was passed through a granulator (a rotating, horizontal cylindrical mixer without flights) in which it was retained for an average of about three minutes. The fertilizer then entered a parallel current, direct heated rotary drier in which its temperature was raised to 92° C., with a simultaneous reduction of water content to about 2%. The dried fertilizer was cooled and screened. About 150 lbs./hr. of material passed through a Tyler 6 mesh screen and retained on a Tyler 14 mesh screen was withdrawn as product. Material larger than 6 mesh was crushed and combined with the balance of the material not taken as product to provide recycle for the system. Analysis of a sample of the product, taken as made, gave the following results:

| | | |
|---|---|---|
| Total N | percent | 20.2 |
| Free urea N | do | 3.5 |
| Water insoluble N | do | 7.4 |
| Activity index | | 47 |
| Total $P_2O_5$ | percent | 10.5 |
| Citrate insoluble $P_2O_5$ | do | 0.1 |
| $K_2O$ | do | 5.0 |
| $H_2O$ | do | 1.9 |
| pH in water | | 5.8 |
| Bulk density | lbs./cu. ft. | 36 |

*Example 2*

This example demonstrates the preparation of a 20–8–5 grade of fertilizer. The following materials were fed to an open top, agitated tank equipped with an overflow line:

35.5 lbs./hr. pelleted urea (46% N).
16.2 lbs./hr. urea-ammonia solution (43.1% urea, 30.6% ammonia, 26.3% water).
23.1 lbs./hr. wet process phosphoric acid (53.2% $P_2O_5$).
2.3 lbs./hr. sulfuric acid (93% $H_2SO_4$).
12.0 lbs./hr. water.

Average conditions in the tank were six minutes retention time, pH of 6.0 and temperature of 89° C., with all the heat required to obtain this temperature supplied by the heat of reaction of the acids and base. Essentially all the urea was dissolved in this operation. The solution was conducted by the overflow line to a TVA ammoniator. Into the overflow line were introduced a urea-formaldehyde concentrate (composition equivalent to 60% formaldehyde, 25% urea, 15% water) at a rate of 24.4 lbs./hr. and 93% sulfuric acid at a rate of 0.8 lb./hr. The points of injection were selected to give about 10 seconds mixing time for the urea-formaldehyde concentrate and one second mixing time for the acid before the contents of the line were discharged into the TVA ammoniator. The pH of the mixture as it left the pipe was about 4. The following materials at an average temperature of about 45° C. were also charged to the inlet of the ammoniator:

13.1 lbs./hr. potassium chloride (58.6% $K_2O$).
19.3 lbs./hr. ammonium sulfate (20.5% N).
33.8 lbs./hr. expanded vermiculite.
1.5 lbs./hr. dolomite.
250 lbs./hr. recycled dried material from a subsequent step.

An average of about five minutes was required for material to pass through the TVA ammoniator. At a point just before the material discharged from the ammoniator, aqua ammonia (30% $NH_3$) was added at a rate of 0.9 lb./hr. which resulted in the damp mixture leaving the ammoniator having a pH of 5.9. The mixture was dried to a product temperature of 94° C., cooled, and screened in conventional equipment. About 150 lbs./hr. of fertilizer in the particle size range of through 6 mesh Tyler screen and retained on a 14 mesh Tyler screen was withdrawn as product and the remainder of the dried material recycled to the ammoniator. Analysis of the product was as follows:

| | | |
|---|---|---|
| Total N | percent | 20.3 |
| Free urea N | do | 3.7 |
| Water insoluble N | do | 5.3 |
| Activity index | | 42 |
| Total $P_2O_5$ | percent | 8.5 |
| Citrate insoluble $P_2O_5$ | do | 0.0 |
| Water soluble $P_2O_5$ | do | 7.7 |
| $K_2O$ | do | 5.0 |
| $H_2O$ | do | 2.4 |
| pH | | 5.6 |
| Bulk density | lbs./cu. ft. | 35 |

*Example 3*

This example demonstrates the preparation of a 25–10–5 grade of fertilizer. The following materials were fed to an open top, agitated tank equipped with an overflow line:

40.7 lbs./hr. pelleted urea (46% N).
3.9 lbs./hr. anhydrous ammonia.
18.8 lbs./hr. wet-process phosphoric acid (54.3% $P_2O_5$).
3.3 lbs./hr. sulfuric acid (93% $H_2SO_4$).
15.3 lbs./hr. water.

Average conditions in the tank were five minutes retention time, pH of 5.4 and temperature of 80° C., with all the heat required to obtain this temperature supplied by the heat of reaction of the acids and base. Essentially all the urea was dissolved in this operation. The solution was conducted by the overflow line to a TVA ammoniator. In the overflow line was introduced a urea-formaldehyde concentrate (composition equivalent to 60% formaldehyde, 25% urea, 15% water) at a rate of 24 pounds per hour. The point of injection was selected to give about 5 seconds mixing time before the contents of the line discharged into the TVA ammoniator. The pH of the mixture as it left the pipe was about 5.0. The following materials at an average temperature of about 45° C. were also charged to the inlet of the ammoniator:

8.6 lbs./hr. potassium chloride (59.3% $K_2O$).
14.5 lbs./hr. expanded vermiculite.
1.0 lb./hr. dolomite.
502.0 lbs./hr. recycled dried material from a subsequent step.

An average of about 5 minutes was required for material to pass through the ammoniator. At a point just before the material discharged from the ammoniator, anhydrous ammonia was added at a rate of 0.6 pound per hour which resulted in the wet mixture leaving the ammoniator having a pH of 5.9. Material leaving the ammoniator was passed to a dryer by means of a belt conveyor. The fertilizer was dried to a product temperature of 93° C., and it was cooled and screened in conventional equipment. About 100 pounds per hour of fertilizer in the particle size range of through 6 mesh Tyler screen and retained on a 10 mesh Tyler screen was withdrawn as product and the remainder of the dried material recycled to the ammoniator. Analysis of the product was as follows:

| | | |
|---|---|---|
| Total N | percent | 25.3 |
| Free urea N | do | 4.2 |
| Water-insoluble N | do | 10.6 |
| Activity index | | 42 |
| Total $P_2O_5$ | percent | 10.2 |
| $K_2O$ | do | 5.7 |
| $H_2O$ | do | 1.4 |
| pH | | 5.0 |
| Bulk density | lbs./cu. ft. | 50 |

Although certain preferred embodiments of the invention have been disclosed for purpose of illustration, it will be evident that various changes and modifications may be made therein without departing from the scope and spirit of the invention.

We claim:
1. The method of preparing a mixed fertilizer containing a large portion of its nitrogen in the form of a coating of slow acting ureaform nitrogen of good agronomic availability which comprises forming a solution of urea and ammonium salts at a temperature of 70 to 95° C. and a pH lying within the range of 4 to 6.5; said ammonium salts being selected from the group consisting of mono-ammonium phosphate, diammonium phosphate, mixtures thereof, and mixtures with ammonium sulfate; adding sufficient urea-formaldehyde concentrate to adjust the urea to formaldehyde mol ratio to 1.2–2.0; the constituents of the resulting mixture being present in the ratio of 1 part urea to 0.1–1 part phosphate calculated as phosphoric acid, 0–0.5 part sulfate calculated as sulfuric acid and 0.2–1 part water; within 1 to 20 seconds of such addition coating 2 parts of fertilizer solids with 0.1–1 part of the resultant viscous mixture by mixing said mixture with said fertilizer solids for a period of at least 3 minutes, said solids being introduced to the mixing vessel at a temperature between 35 and 60° C.; adjusting the pH of the moist mixture to 5–7 and drying the moist fertilizer mixture to final solids temperature between about 90 and 100° C. to obtain a fertilizer coated with ureaform in which the water-insoluble nitrogen has an activity index above about 40.

2. The method of preparing a mixed fertilizer containing a large portion of its nitrogen in the form of a coating of slow acting ureaform nitrogen of good agronomic availability which comprises forming a solution of urea and ammonium salts at a temperature of 78 to 90° C. and a pH lying within the range of 4.5 to 5.5; said ammonium salts being selected from the group consisting of monoammonium phosphate, diammonium phosphate, mixtures thereof, and mixtures with ammonium sulfate; adding sufficient urea-formaldehyde concentrate to adjust the urea to formaldehyde mol ratio to 1.2–2.0; the constituents of the resulting mixture being present in the ratio of 1 part urea to 0.1–1 part phosphate calculated as phosphoric acid, 0–0.5 part sulphate calculated as sulfuric acid and 0.2–1 part water; within 2 to 10 seconds of such addition coating 2 parts of fertilizer solids with 0.1–1 part of the resultant viscous mixture by mixing said mixture with said fertilizer solids for a period of at least 3 minutes; said solids being introduced to the mixing vessel at a temperature of about 40 to 45° C.; adjusting the pH of the moist mixture to 5–7; and drying the moist fertilizer mixture to final solids temperature between 90 and 100° C. to obtain a fertilizer coated with ureaform in which the water-insoluble nitrogen has an activity index above about 40.

3. The method of preparing a mixed fertilizer containing ureaform which comprises mixing at 70° to 95° C. one part urea, 0.1–1 part $H_3PO_4$, 0–0.5 part $H_2SO_4$, 0.2–1 part of water with sufficient $NH_3$ to adjust the pH to 4–6.5; adding sufficient urea-formaldehyde concentrate to adjust urea to formaldehyde mol ratio to 1.2–2.0; within 1 to 20 seconds of such addition coating two parts of fertilizer solids with 0.1–1 part of the resultant viscous mixture by agitating said mixture with said fertilizer solids for a period of at least 3 minutes; said fertilizer solids having a temperature between 35 and 60° C. upon addition to the mixing vessel; adjusting the pH of the moist mixture to 5–7 and drying the moist fertilizer to final solids temperature between about 90 and 100° C. to obtain a mixed fertilizer containing a large portion of its nitrogen in the form of a coating of slow acting ureaform nitrogen of good agronomic availability, the water-insoluble nitrogen having an activity index above about 40.

4. The method of preparing a mixed fertilizer containing ureaform which comprises mixing at 78 to 90° C. one part urea, 0.1–1 part $H_3PO_4$, 0–0.5 part $H_2SO_4$, 0.2–1 part of water with sufficient $NH_3$ to adjust the pH to 4–6.5; adding sufficient urea-formaldehyde concentrate to adjust the urea to formaldehyde mol ratio to 1.2–2.0; said urea-formaldehyde concentrate being equivalent in composition to about 60% formaldehyde, about 25% urea, and about 15% water; within 2 to 10 seconds of such addition coating 2 parts of fertilizer solids with 0.1–1 part of the resultant viscous mixture by agitating said mixture with said fertilizer solids for a period of at least 3 minutes; said solids having a temperature of about 40 to 45° C. upon addition to the mixing vessel; adjusting the pH of the moist mixture to 5–7 and drying the moist fertilizer to final solids temperature between about 90 and 100° C. to obtain a mixed fertilizer containing a large portion of its nitrogen in the form of a coating of slow acting ureaform nitrogen of good agronomic availability, the water insoluble nitrogen having an activity index above about 40.

References Cited in the file of this patent
UNITED STATES PATENTS

| | | |
|---|---|---|
| 2,255,026 | Keenen et al. | Sept. 2, 1941 |
| 2,502,996 | Rohnen | Apr. 4, 1950 |
| 2,618,546 | Davenport | Nov. 18, 1952 |

OTHER REFERENCES

Clark et al.: "Industrial and Engineering Chemistry," vol. 40, No. 7, pages 1178–1183, July 1948.